(12) United States Patent
Tsai

(10) Patent No.: US 6,222,934 B1
(45) Date of Patent: Apr. 24, 2001

(54) TEST CHART FOR DETERMINING THE IMAGE QUALITY OF AN OPTICAL SCANNER

(75) Inventor: Jenn-Tsair Tsai, Taipei (TW)

(73) Assignee: Mustek Systems Inc., Hsinchu (TW)

(*) Notice: Subject to any disclaimer, the term of this patent is extended or adjusted under 35 U.S.C. 154(b) by 0 days.

(21) Appl. No.: 09/116,896

(22) Filed: Jul. 17, 1998

(51) Int. Cl.$^7$ .................................................. G06K 9/00
(52) U.S. Cl. .................................... 382/112; 358/504
(58) Field of Search ................................ 382/190, 112, 382/201, 206; 358/474, 504, 505, 2; 356/401, 4.02

(56) References Cited

U.S. PATENT DOCUMENTS

| | | | |
|---|---|---|---|
| D. 363,031 | * 10/1995 | Bruegmann et al. | D10/46 |
| 4,020,281 | * 4/1977 | Davis | 178/18 |
| 4,575,124 | * 3/1986 | Morrison | 283/1 A |
| 5,953,990 | * 9/1999 | Chalmers | 101/211 |

* cited by examiner

*Primary Examiner*—Jerome Grant, II
(74) *Attorney, Agent, or Firm*—Pillsbury Winthrop LLP

(57) ABSTRACT

A test chart printed on the front end of a calibration paper readable by an optical scanner for image quality test. The test chart comprises missing line test patterns for showing line missed in an image; gray-level test patterns located at the left side, the right side and at the center of said test chart for showing color balance, color consistency, black and white effects, and step transition of an image; resolution test patterns each located at the left side, the right side and at the center of said test chart for showing resolution of an image read by said optical scanner; and scaling-up test patterns each located at the front end on the two sides of said test chart and at the bottom of said test chart for showing the horizontal scaling up and vertical scaling up of an image. The patterns on the test chart are so compact and well designed that they can be read by an optical scanner by only one pass of image reading. Moreover, from the image of the test chart, a computer program can efficiently perform image quality tests to determine the quality of an optical scanner.

10 Claims, 2 Drawing Sheets

TEST CHART FOR DETERMINING THE IMAGE QUALITY OF AN OPTICAL SCANNER

BACKGROUND OF THE INVENTION

A. Field of the Invention

The invention relates to a test chart, especially to a test chart printed on a calibration paper readable by an optical scanner for image quality test.

B. Description of the Prior Art

It is known that an optical scanner has to pass strict image quality tests before it can be sold on the market. The tests include horizontal and vertical scaling-up, skew, color consistency, color balance, shading, step transition, peripheral, resolution, and missing line and so on. These tests are usually done by examining an image of a test chart scanned by the optical scanner under quality testing. Since the test chart contains specially designed patterns for testing various features of an optical scanner, so from the images of the test chart, the image quality of the optical scanner can be shown easily.

Conventional test charts are usually not well organized. The data size of the test patterns is usually so large that each pattern on the test chart has to be scanned separately. And each testing is also processed separately. Consequently, the image quality test of an optical scanner consumes lots of testing time and efforts. Moreover, some test charts do not have a few important test items, such as step transition test, image skew test, and center resolution test. Besides, the patterns for identifying peripherals are usually too small to be detected.

SUMMARY OF THE INVENTION

Accordingly, it is an object of the present invention to provide a test chart which contains patterns sufficient enough for doing all test items and which is so compact that one pass of scanning is enough to perform all test items, thereby to speed up the testing procedure and save time and efforts.

It is another object of the invention to provide a test chart which can generate an image of small data size to be easily processed by a computer program to determine the image quality of an optical scanner.

Accordingly, the inventive test chart is printed on the front end of a calibration paper which is about A4 size. The test chart is only about the size of 20×5 cm. The test chart includes patterns for testing missing lines, gray levels, resolution, horizontal and vertical scaling up, recognition capability, skew and peripheral. The pattern for testing missing lines is a pattern of slanting line segment having inclination of 45 degrees. The patterns for testing gray levels are blocks of different gray levels grouped at the left side, the right side and at the center of the test chart and arranged in the same order. The patterns for testing resolution are line arts of different resolutions grouped at the left side, the right side and at the center of said test chart and arranged in the same order. The patterns for testing scaling-up are a pair of black blocks symmetrically located at the front end of the two sides of the test chart and a black bar line located at the bottom of the test chart.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

To minimize the size of the test chart and maximize the functions of the test chart, a new test chart is designed with test patterns located at the front end of a calibration paper. The entire test chart is about 20×5 cm. The test chart contains patterns for testing missing lines, gray levels, resolution, horizontal and vertical scaling up, recognition capability, skew and peripheral.

Figure 1:
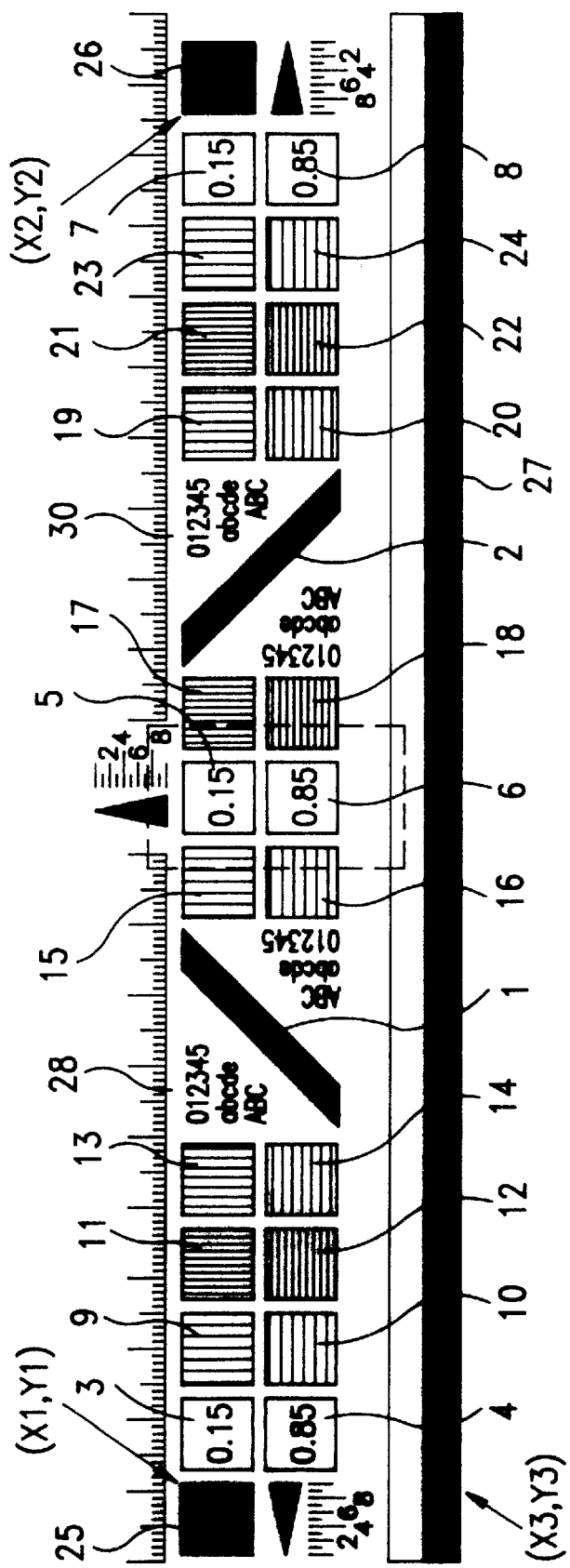
FIG. 1 is a schematic diagram showing the test chart according to the preferred embodiment of the invention.

Refer to FIG. 1, the test patterns for missing lines are slanting line segments 1, 2 of 45 degree of inclination. Detecting the gray levels of the pixels along the edge of the line segments 1, 2 can determine if the image has missing lines. The inclination of 45 degrees can obtain the best results for showing missing lines. However, the inclinations of the slanting line segments 1, 2 are not restricted to 45 degrees. The number of line segments is not restricted to two either. And the location of the line segments 1, 2 can be at any reasonable place on the test chart.

The patterns for testing gray levels, color balance, color consistency are blocks of different gray levels 3, 4, 5, 6, 7, 8 as illustrated in FIG. 1. They are located on the left side, the right side and at the center of the test chart and grouped in the same order. The gray levels of the blocks 3, 4, 5, 6, 7, 8 are only two but this is not a restriction. Since the test at this stage is for mass production and detailed tests on gray levels shall have already been done before this stage, therefore two gray levels shall be enough to tell the test results. Nevertheless, it shall be notice that the blocks 3, 4, 5, 6, 7, 8 must be located on the left side, the right side and at the center of the test chart and grouped in the same order so that the consistency of gray levels of the image can be tested.

From the blocks of gray levels, we can also determine the color consistency of the images. For instance, read the maximum red value R(M) and the minimum red value R(m) between the average red value of the gray level blocks 7, 8, and then compute the red value according to the formula: $(M-m)/((M+m)/2)$. The computation formula is the same for green and blue colors. From the computation results, we can see if the RGB colors of the image are consistent or not.

From the blocks of gray levels, we can do color balance test too. Read the gray level blocks 5, 6 at the center and then compare the difference of the RGB gray levels of blocks 5, 6 by computing the formula: $|R-B|\&|R-G|\&|B-G|$. And then determine if the result of this formula is less than an error rate. If yes, that means the color balance of this image is normal, otherwise not. Moreover, detecting if the RGB gray levels of the blocks 5, 6 are distributed within a certain range can tell if the shading of the image is normal. Furthermore, the blocks of gray levels can also be used for testing step transition. The computation formula is: (black gray levels−white gray levels) * 0.2+black gray levels, and (white gray levels−black gray levels) * 0.8+black gray level. There are a few pixels falling in this range. Then, from these pixels, we can determine if their step transition is normal or not.

The patterns for testing resolutions are line arts of various resolutions. To test if the resolution are consistent everywhere in the entire image, the line arts 9, 10, 11, 12, 13, 14, 15, 16, 17, 18, 19, 20, 21, 22, 23, 24 are located on the left side, the right side and at the center of the test chart and grouped in the same order. The resolution of the line arts depends on the model of the scanner under test. The resolutions of the line arts shown on the test chart are 200 dpi (dot per inch), 400 dpi, and 240 dpi respectively.

The resolution test includes testing on horizontal direction and vertical direction. The test involves in taking two pixels L1 and L2 within a predetermined range of resolutions, then compute (L2−L1)/(L2+L1) to get the average value of the resolution. From the average value of the resolution, we can determine if the vertical resolution and the horizontal resolution of the image are normal or not.

The test for scaling up in horizontal and vertical directions is based on a pair of black blocks 25, 26 and a black bar line 27. The black blocks 25, 26 are used for reference coordinates for $(X_1,Y_1)$ and $(X_2,Y_2)$ respectively. The black bar line 27 is used for reference coordinate for $(X_3,Y_3)$. From these coordinates, we can tell if the scaling up of an image is normal or not. For instance, when testing the scaling up in horizontal direction, we may compute: $((X_2-X_1)-X_2\&X_1/(X_2\&X_1)$. For the same reason, to test the scaling up in vertical direction, we can compute: $((Y_3-Y_1)- Y_3\&Y_1t)/Y_3\& Y_1)$ to see if the scaling up in vertical direction is normal or not.

In addition, the black level blocks $(X_1,Y_1)25$, $(X_2,Y_2)26$ can be used for testing if the image is skew. This can be done by computing: $(Y_2-Y_1)/(X_2-X_1)$. If the value is 1, that means the image is normal. If not, the image is not normal. The blocks $(X_1,Y_1)25$, $(X_2,Y_2)26$ can also be used for determining peripheral and center point of the image to see if the image is in the right position.

The test chart as illustrated in FIG. 1 is so compact that there is still room for adding a few characters or numbers 28 for testing the recognition capability of the scanner. After adding those characters or numbers 28, we can directly know the effects by seeing the image.

The test chart as illustrated in FIG. 1 is designed based on the principle that the axis of the CCD must be perpendicular to the image plane. The image of the test chart is small enough for a computer program to perform image tests. Nevertheless, the test chart also contains rulers 30 so that people can check the image results directly. The test chart occupies only an area of about 20×5 cm of the calibration paper. The remained space of the calibration paper can be utilized by the research and development engineers for other tests or for the purpose of pre-scan.

Figure 2:
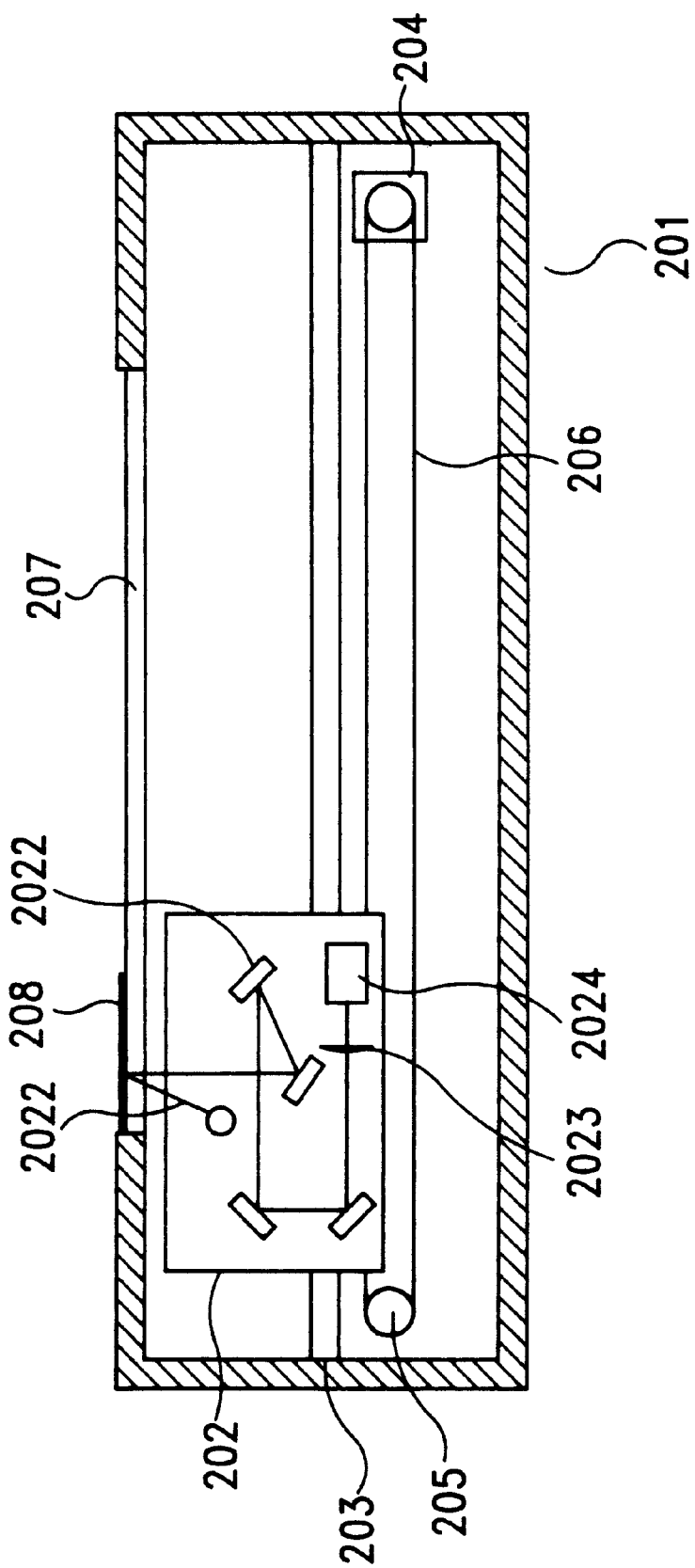
FIG. 2 is a schematic diagram showing the test chart is to be read by an optical scanner for image quality test.

The application of the test chart is shown on FIG. 2. A conventional flatbed scanner 201 including an image reading apparatus 202 mounted on a pair of parallel shafts 203 to be driven by a transmission system. The transmission system consists of a motor 204, pulleys 205 and belt 206. The image reading apparatus 202 includes a light source 2021, a set of mirrors 2022, a lens 2023 for focusing, and a CCD 2024 for image reading. When testing, the test chart 208 is placed on the edge of the document tray 207 for image quality test. Since the test chart is only about 5 cm in length, the speed for image reading shall be very fast. FIG. 2 is only exemplary for showing how the test chart can be applied to an optical scanner. The application of the test chart is not restricted to flatbed scanners. It is not restricted to using CCD for reading images either.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A test chart printed on the front end of a calibration paper readable by an optical scanner for image quality test, comprising:

missing line test means for showing line missed in an image read by said optical scanner;

gray-level test means located at the left side, the right side and at the center of said test chart for showing color balance, color consistency, black and white effects, and step transition of an image read by said optical scanner;

resolution test means each located at the left side, the right side and at the center of said test chart for showing resolution of an image read by said optical scanner; and scaling-up test means each located at the front end on the two sides of said test chart and at the bottom of said test chart for showing the horizontal scaling up and vertical scaling up of an image read by said optical scanner.

2. The test chart as claimed in claim 1, wherein said missing line test means, said gray level test means, said resolution test means, and said scaling-up test means are printed on an area having size of about 20×5 cm and arranged at the front end of said calibration paper.

3. The test chart as claimed in claim 1, wherein said missing line test means is a pattern of slanting line segments having inclination of 45 degrees.

4. The test chart as claimed in claim 1, wherein said gray level-test means comprises:

a plurality of blocks having different gray levels grouped at the left side, the right side and at the center of said test chart and arranged in the same order.

5. The test chart as claimed in claim 1, wherein said resolution test means comprises:

a plurality of line arts having different resolutions grouped at the left side, the right side and at the center of said test chart and arranged in the same order.

6. The test chart as claimed in claim 1, wherein said scaling-up test means comprises:

a pair of black blocks symmetrically located at the front end of the two sides of said test chart; and a black bar line located at the bottom of said test chart.

7. The test chart as claimed in claim 1, wherein said scaling-up test means is for testing whether an image is skew after scaling up.

8. The test chart as claimed in claim 1, wherein said scaling-up test means is for testing whether the peripheral of an image is in the right position.

9. The test chart as claimed in claim 1, further comprising:

recognition capability test means for showing meaningful patterns of an image read by said optical scanner.

10. The test chart as claimed in claim 9, wherein said recognition capability test means are characters and numbers of various sizes.

* * * * *